US007844295B1

(12) United States Patent
Ngan

(10) Patent No.: US 7,844,295 B1
(45) Date of Patent: Nov. 30, 2010

(54) USING A WIRELESS INTERCOM TO TALK-AROUND A CELLULAR WIRELESS NETWORK

(75) Inventor: John Cheong-Wai Ngan, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 528 days.

(21) Appl. No.: 11/130,997

(22) Filed: May 17, 2005

(51) Int. Cl.
*H04M 1/00* (2006.01)
*H04B 5/00* (2006.01)
*H04W 4/00* (2009.01)

(52) U.S. Cl. ............... 455/552.1; 455/426.1; 455/41.1; 370/338

(58) Field of Classification Search ............ 455/435.2, 455/426, 410, 552.1, 41, 62, 411, 426.1, 455/553.1, 41.1–41.3; 379/211.04
See application file for complete search history.

(56) References Cited

U.S. PATENT DOCUMENTS

| | | | | |
|---|---|---|---|---|
| 6,011,978 | A * | 1/2000 | Ault et al. ................. | 455/552.1 |
| 6,445,921 | B1 * | 9/2002 | Bell ......................... | 455/426.1 |
| 6,658,264 | B1 * | 12/2003 | Irvin ........................ | 455/552.1 |
| 6,678,526 | B1 * | 1/2004 | Sugirtharaj ................ | 455/450 |
| 6,766,160 | B1 * | 7/2004 | Lemilainen et al. ........ | 455/41.2 |
| 2002/0131445 | A1 * | 9/2002 | Skubic et al. .............. | 370/465 |
| 2002/0197956 | A1 * | 12/2002 | Annola et al. .............. | 455/41 |
| 2003/0063733 | A1 * | 4/2003 | Levine et al. .............. | 379/211.04 |
| 2004/0009751 | A1 * | 1/2004 | Michaelis et al. ........... | 455/434 |
| 2004/0072593 | A1 * | 4/2004 | Robbins et al. ............. | 455/560 |
| 2004/0116073 | A1 * | 6/2004 | Mauney et al. ............. | 455/445 |
| 2004/0203945 | A1 * | 10/2004 | Qu et al. ................... | 455/466 |
| 2005/0070280 | A1 * | 3/2005 | Jung et al. ................. | 455/434 |
| 2005/0130627 | A1 * | 6/2005 | Calmels et al. ............ | 455/41.2 |
| 2005/0255878 | A1 * | 11/2005 | Leinonen et al. ......... | 455/552.1 |
| 2006/0013159 | A2 * | 1/2006 | Gurevich .................. | 370/328 |
| 2006/0148448 | A1 * | 7/2006 | Turner ...................... | 455/410 |

OTHER PUBLICATIONS

Specification of the Bluetooth System: Master Table of Contents & Compliance Requirements, Nov. 5, 2003, vol. 0, p. 16.*
Bluetooth SIG Security Expert Group, Bluetooth Security White Paper, May 14, 2002, Rev. 1.01, p. 41.*
BlueTomorrow.com "Bluetooth Pairing" http://www.bluetomorrow.com/content/section/180/284/, (printed on May 13, 2009).*

* cited by examiner

*Primary Examiner*—Lester Kincaid
*Assistant Examiner*—Daniel Lai

(57) ABSTRACT

A method and system are disclosed for bypassing a cellular wireless communications system by using a peer-to-peer wireless link for voice communications between BLUETOOTH enabled handsets. In an exemplary embodiment, when a ten-digit telephone number is dialed to place a call from a cellular wireless telephone, the cellular wireless telephone determines whether a termination-point, such as a second cellular wireless telephone, associated with the ten-digit telephone number is within range of the peer-to-peer wireless link. If the termination-point is within range, then a direct intercom session may be established over the peer-to-peer wireless link. Otherwise, a call initiation is requested over the cellular wireless communications system.

3 Claims, 6 Drawing Sheets

USING A WIRELESS INTERCOM TO TALK-AROUND A CELLULAR WIRELESS NETWORK

FIELD OF THE INVENTION

The present invention relates to wireless communications and, more particularly, to methods of operating dual mode wireless handsets.

DESCRIPTION OF RELATED ART

In a typical cellular radio communications system, an area is divided geographically into a number of cell sites, each defined by a radio frequency (RF) radiation pattern from a respective base transceiver station (BTS) antenna. The base station antennae in the cells are in turn coupled to a base station controller (BSC) which is then coupled to a telecommunications network, such as the public switched telephone network (PSTN).

When a cellular wireless telephone is positioned in a cell, the cellular wireless telephone may communicate via an RF air interface with the BTS antenna of the cell. Consequently, a communication path is established between the mobile station and the telecommunications network, via the air interface, the BTS, the BSC and the switch or gateway.

A cellular wireless telephone may also be configured to communicate directly with other devices via a local wireless intercom session. In a local wireless intercom session, two devices may establish a voice connection via a short-range two-way RF connection. Often the RF connection is created on an ad-hoc basis. An example of a local wireless intercom session is a BLUETOOTH intercom session. Two or more BLUETOOTH-enabled devices can create ad-hoc networks called piconets. Once formed, each device in the piconet can communicate with other devices in the piconet.

In the literature, theorists have proposed configuring a single wireless device to operate as (i) a BLUETOOTH intercom at the office, (ii) a cordless/portable phone coupled with a landline base station at home, and (iii) a cellular wireless telephone in other locations.

SUMMARY

Both cellular wireless networks and local wireless intercom networks offer the ability to establish a voice connection between two communication devices. An exemplary embodiment of the invention provides for establishing a voice connection between a first device and a second device through either a cellular wireless communications network or a local wireless intercom communications network.

To begin with, the first device initiates a call sequence after receiving a request to initiate a voice connection with the second device. In the call sequence, the first device determines whether the second device is available to establish a voice connection via a first network pathway, where the first network pathway is one of either (i) a cellular wireless communications pathway or (ii) a local wireless intercom communications pathway. If the second device is available for a voice connection via the first network pathway, then the calling device initiates the voice connection via the first network pathway. On the other hand, if the second device is not available for a voice connection via the first network pathway, then the first device attempts a voice connection via a second network pathway, where the second network pathway the remaining pathway from the group of (i) the cellular wireless communications pathway and (ii) the local wireless intercom communications pathway.

In an exemplary embodiment, the first network pathway is the local wireless intercom pathway and the second network pathway is the cellular wireless communications pathway. Examples of these pathways include an ad-hoc BLUETOOTH network pathway and a CDMA cellular network pathway respectively. In that case, there are a number of ways that the first device may determine whether the second device is available for a voice session over the local wireless intercom communications pathway. These determination methods may include, for instance, one or a combination of:

Broadcasting a telephone number of the second device as a passkey to facilitate a pairing operation, and receiving a response from the second device;

Broadcasting a discovery inquiry, receiving an inquiry response, and determining whether the inquiry response was received from the second device;

Determining whether the second device is within wireless intercom range of the first device; and Determining whether a trusted device list includes an identifier of the second device.

In an alternative embodiment, the first network pathway is the cellular wireless communications pathway and the second network pathway is the local wireless intercom pathway. In that case, there are a number of ways that the first device may determine whether the second device is available for a voice session over the cellular wireless communications pathway. These determination methods may include, for instance, one or a combination of:

Receiving an indication that a call initiation signal did not reach the second device;

Receiving a fast busy signal; and

Timing-out.

Rather than attempting the voice connections in a sequential fashion (first one pathway, then another pathway), the first device may attempt to establish a voice connection over both the cellular wireless communication pathway and the local wireless intercom communication pathway. In order to speed-up the process of establishing a voice connection, for instance, the two attempts can overlap in time. Upon establishing a voice connection over one of the pathways, the attempt to connect over the other pathway is aborted.

DETAILED DESCRIPTION OF EXEMPLARY EMBODIMENTS

I. Exemplary Network Architecture a. Overview

An exemplary system includes both (i) a local wireless intercom communications pathway operating directly between two wireless devices and a cellular wireless communications pathway operating over a cellular wireless communications network. The cellular wireless communications network includes a number of base transceiver station (BTS) antennas that are each coupled to a base station controller (BSC) which, in turn, is coupled to a mobile switching center (MSC) responsible for call routing. Each MSC may be coupled to a telecommunications network, such as the public switched telephone network (PSTN). Each BTS antenna generates a radiation pattern that defines a cell site in the cellular wireless communications network.

Figure 1:
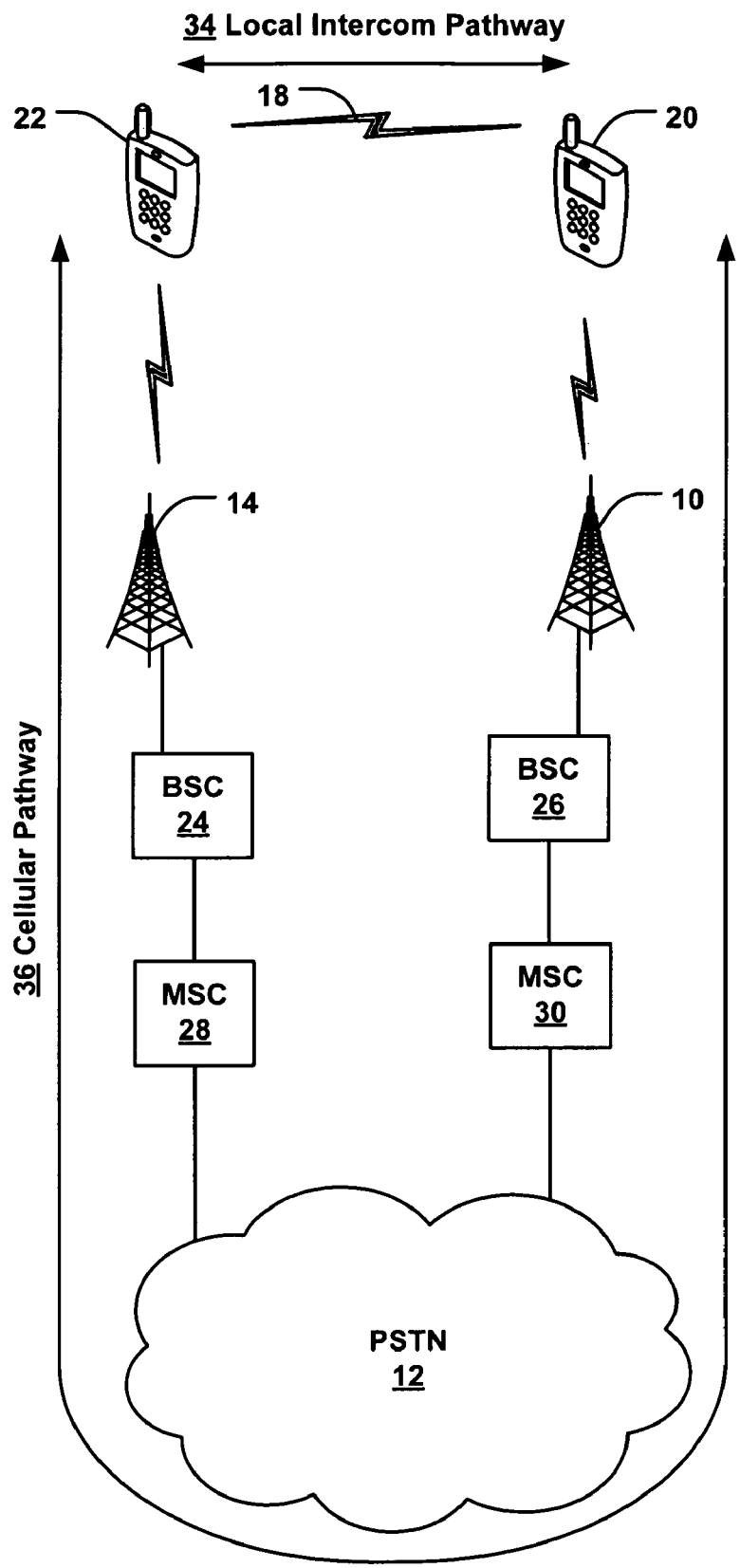
FIG. 1 is a block diagram of a system in which an exemplary embodiment of the invention can be employed.

Referring to the drawings, FIG. 1 is a simplified block diagram illustrating a system in which an exemplary embodiment of the invention can be implemented. A first wireless communications device 20 may establish a voice connection with a second wireless communications device 22 via a cellular wireless communication pathway 36. As such, a transmission from the first wireless communications device 20 to the second wireless communications device 22 may travel from the first wireless communications device 20 to a first BTS antenna 10 and BSC 26, then to a first MSC 30, which transfers the transmission to the PSTN 12. From the PSTN 12, the transmission may pass to a second MSC 28, then through a second BSC 24 and BTS antenna 14, and finally to the second wireless communications device 22.

In an alternative arrangement, devices 20, 22 may share an MSC, in which case the MSC may route the call from one device to the other without transporting the call over the PSTN 12.

The first and second devices 20, 22 may also establish a voice connection via a local wireless intercom pathway 34. In exemplary embodiment, the local wireless intercom pathway 34 is available via an ad-hoc network created by two or more wireless devices enabled to create a wireless local area peer-to-peer network. In FIG. 1, the local wireless intercom communications pathway is shown as a direct wireless communication 18 between the first and second devices 20, 24. In another embodiment, an indirect intercom connection may operate through a local area network access point, for instance.

In operation, the first wireless communications device 20 receives a request from a human user to establish a voice connection with the second wireless communications device 22. In response to the request, the first wireless communications device 20 determines whether the second wireless communications device 22 is available to establish a voice connection via a first network pathway, where the first network pathway is a predetermined one of the cellular wireless communications pathway or the local wireless intercom communications pathway. If the second wireless communications device 22 is available to establish the voice connection via the first network then the first communications device 20 establishes the voice connection via the first network pathway. If, however, the second wireless communications device 22 is unavailable to establish the voice connection via the first network, the first wireless communication device 20 then attempts the voice connection via a second network pathway, where the second network pathway is the remaining pathway from the group of either the cellular wireless communications pathway or the local wireless intercom communications pathway.

Thus, when the first network pathway is down or otherwise unavailable, the second network pathway may be used to establish the voice connection. The redundancy created by the system may (i) provide for better stability and (ii) provide for better system prioritization, for instance.

b. The Local Wireless Intercom Communications Pathway

An exemplary wireless intercom voice connection is provided through the BLUETOOTH protocol. BLUETOOTH is a short-range Radio-Frequency (RF) technology that often operates with a range of around 30 feet.

Before two BLUETOOTH devices can establish an intercom session, the devices complete a device discovery and connection procedure. The device discovery and connection procedure may begin when a first wireless device executes an inquiry function to discover other BLUETOOTH devices. Discoverable devices, such as a second wireless device, will periodically execute an inquiry scan function. In the inquiry scan function, if the discoverable device receives an inquiry message, it enters an inquiry response function and replies with an inquiry response message. The inquiry response messages may include information for establishing a BLUETOOTH connection, such as an address and clock cycle of the discoverable device.

Normally, when two BLUETOOTH devices come into vicinity for the first time, the devices must pair with one another before they can establish an intercom session. The pairing usually requires a predefined identifier for each BLUETOOTH device and a passkey (or password) known at both devices.

In the exemplary embodiment, when the first device 20 is determining whether the second device 22 is available for communication over the local wireless intercom communications pathway, the first device 20 broadcasts the telephone number as a passkey for a local wireless intercom session. In a further embodiment, the second device relies on the passkey when establishing the first device as a trusted device.

c. Cellular Wireless Communications Pathway

FIG. 1 depicts an exemplary cellular wireless communications pathway. Of course, the cellular wireless communications pathway may take a number of forms known to those skilled in the art, or later developed. For instance, the cellular wireless network pathway may be a code division multiple access (CDMA) cellular wireless pathway. CDMA is a digital wireless telephony transmission technique that uses a spread spectrum to transmit voice signals and other data.

In an exemplary embodiment, the first device 20 attempts to initiate a call to the second device 22 via CDMA, but fails to connect. In response to failing to connect, the first device 20 then tries the alternative pathway of connecting via the local wireless intercom communications pathway.

This alternative pathway may be quite helpful when the failure to connect via CDMA is due to failure of the call signal to reach the second device 22. For instance, this may be most useful when the first device 20 receives a fast busy signal or if there is no CDMA traffic channel available to place a call. (A fast busy signal is an indication that the connection was blocked due to a network failure or problem). Normally, a CDMA telephone would not retry a call in those instances.

II. Talk-Around Function Over a First and Second Network

Figure 2:
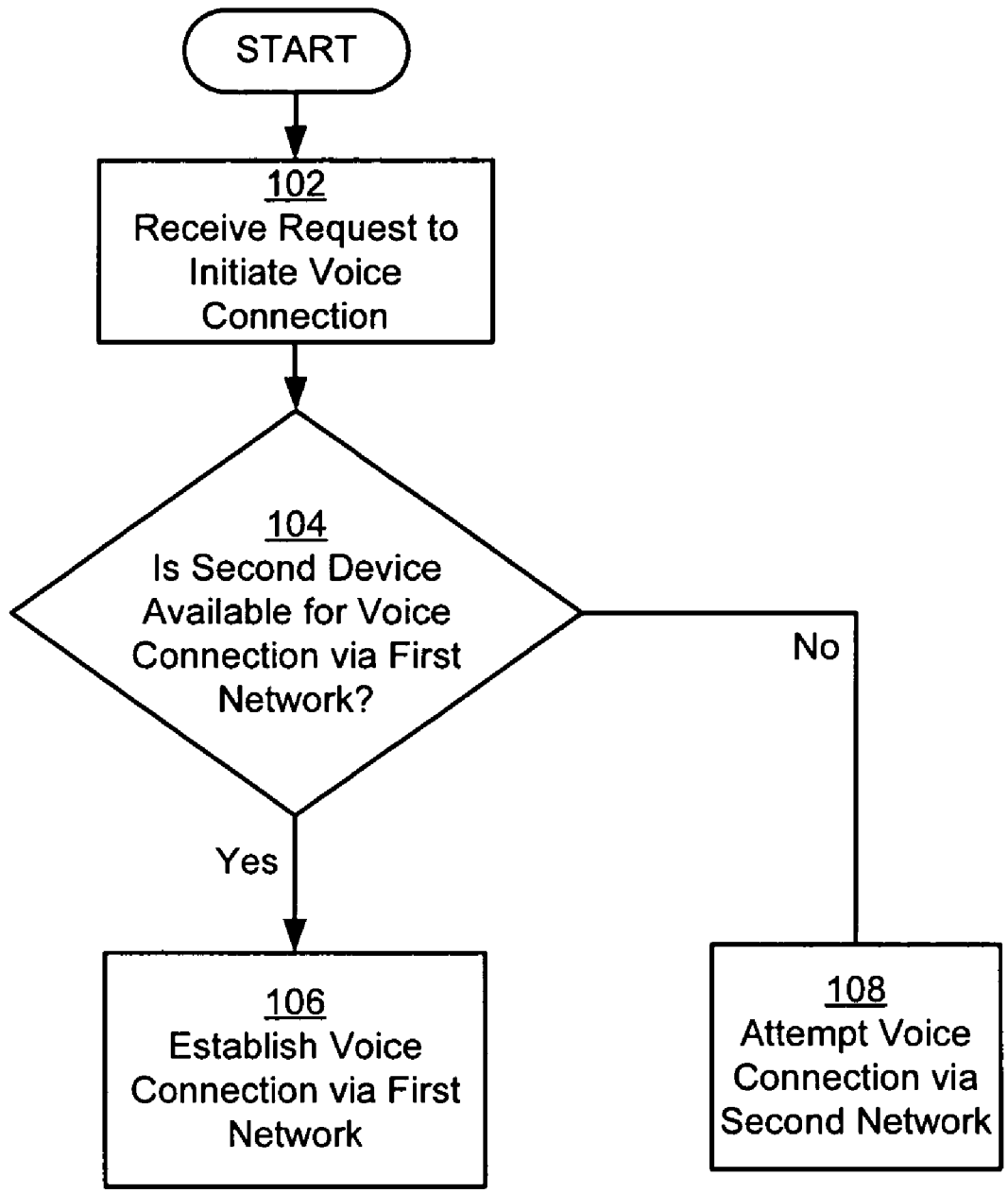
FIG. 2 is a flow chart depicting a talk-around function over first and second network pathways.

FIG. 2 is a flow chart depicting a talk-around function over a first and second network pathway. At 102, a first device receives a request to initiate a voice connection with a second device. The request may be initiated by a human user of the first device, for instance. The request may include an identifier of the second device. This identifier may be a telephone number associated with the second device, for instance. At 104, the first device makes a determination of whether the second device is available for a voice connection via a first network pathway. In two alternative embodiments, the first network pathway is either a cellular wireless communications pathway or a local wireless intercom communications pathway respectively.

If the second device is available for voice communications via the first network pathway, then, at 106, a voice connection is established via the first network between the first and second devices. However, if the second device is unavailable for voice communications via the first network pathway, then, at 108, a voice connection is attempted via a second network pathway between the first and second devices.

III. Primary CDMA Cellular Wireless Talk-Around Function

Figure 3:
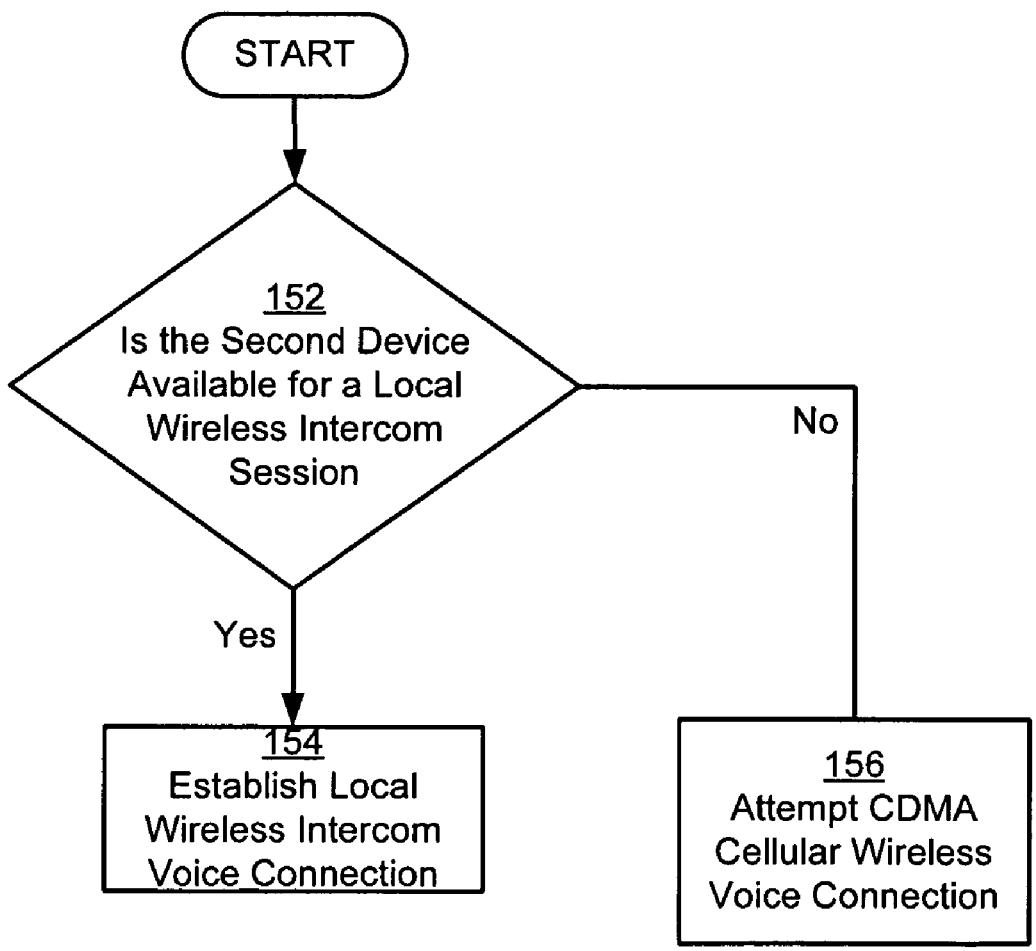
FIG. 3 is a flow chart depicting a primary cellular wireless talk-around function.

FIG. 3 is a flow chart depicting a portion of a primary cellular wireless talk-around function. Generally, a primary CDMA cellular wireless talk-around function first attempts a voice connection over a local wireless intercom communications pathway. Then, if the local wireless intercom communications pathway is unavailable, the function attempts a voice connection over a CDMA cellular wireless pathway.

At 152, a first device determines whether a second device is available to establish a voice connection over the local wireless intercom communications pathway. If the second device is available to establish the voice connection over the intercom pathway, then at 154, a voice connection is established over the local wireless intercom communications pathway between the two devices. However, if the second device is unavailable for voice communications over the local wireless intercom pathway, then at 156, a CDMA cellular wireless voice call is attempted from the first device to the second device.

A number of functions are available, either alone or in combination, for determining whether the second device is available for a voice connection via the local wireless intercom communications pathway. For instance, the first device may broadcast the telephone number of the second device as a BLUETOOTH passkey and await a response from the second device. More generally, the first device may (i) broadcast a local wireless discovery inquiry, (ii) receive an inquiry response, and (iii) determine whether the inquiry response was received from the second device.

In another embodiment, the first device retains a trusted device list that identifies devices that are ready to communicate via the local wireless intercom communications pathway. The first device then can use the trusted device list to determine whether the second device is available for intercom communications by determining whether the trusted device list includes an identifier of the second device.

When the local wireless intercom communications pathway is a BLUETOOTH pathway, the determining whether the second device is available for intercom communications may comprise determining whether the second device is within BLUETOOTH range.

In a further embodiment of the primary CDMA cellular wireless talk-around function, a first wireless device and second wireless device are each equipped with both CDMA transceiver functionality and BLUETOOTH modems. In order to establish a voice connection, the first wireless device dials the 10-digit telephone number of the second device. In response, Program code stored on the first wireless device is then invoked to provide instructions for determining whether the second wireless device is available to connect via a BLUETOOTH connection.

If the BLUETOOTH modem of the second wireless device is switched "on" and the second wireless device is within range, then a BLUETOOTH intercom voice connection is set up between the first wireless device and the second wireless device. In this case, a CDMA connection is not established between the first wireless device and the second wireless device.

If the BLUETOOTH modem of the second wireless device is switched "off" or the second wireless device is out of range, then the intercom algorithm is bypassed, and a CDMA call is placed to the second wireless device.

Using this algorithm, the first wireless device can also communicate with a non-cellular device such as a mobile radio equipped with BLUETOOTH or a standard telephone connected through the PSTN. For instance, if the first wireless device is unable to connect to a standard telephone via a BLUETOOTH modem, then the first wireless device may place a call through the PSTN to the standard telephone.

Figure 4:
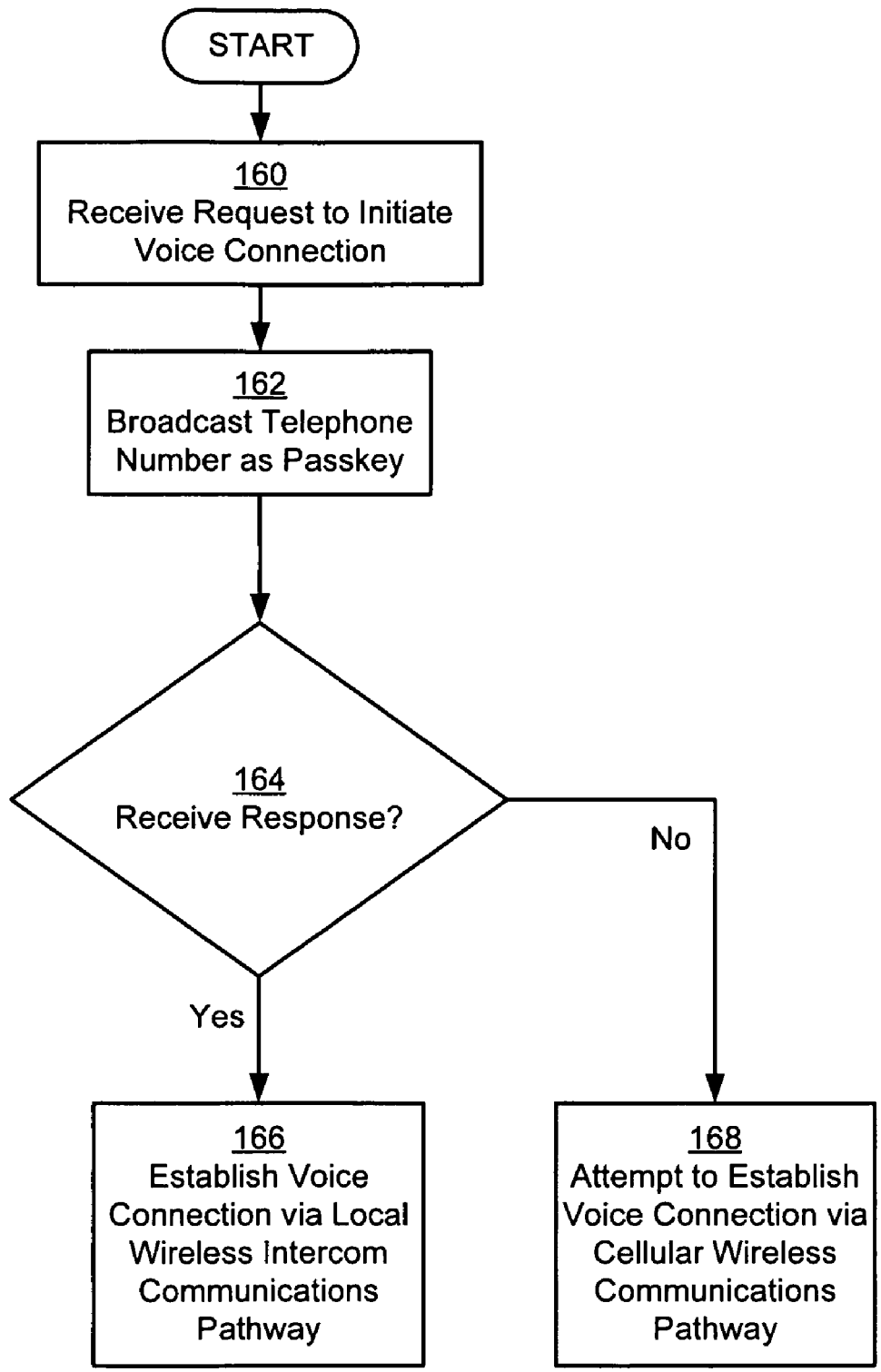
FIG. 4 is a flow chart depicting another example of the primary cellular wireless talk-around function.

FIG. 4 is a flow chart depicting another example of the primary cellular wireless talk-around function. At 160, a first device receives a request to establish a voice connection with a second device. The request includes a 10-digit telephone number of the second device as would be used locate a termination-point for a telephone call via the PSTN. Preferably, the user does not need to provide any other identifier for the second device (such as an intercom communications network identifier or BLUETOOTH identifier).

At 162, the first device broadcasts the 10-digit telephone number as a passkey for establishing a communications session over a local wireless intercom communications pathway. At 164, the first device determines whether it receives a response from the second device. If the first device receives a response that indicates that the second device is available for a connection over the intercom pathway, then, at 166, a local wireless session is established for a local wireless intercom communications voice connection. However, if such a response is not received, then, at 168, the first device attempts a cellular wireless voice connection with the second device.

IV. Secondary Cellular Wireless Talk-Around Function

Figure 5:
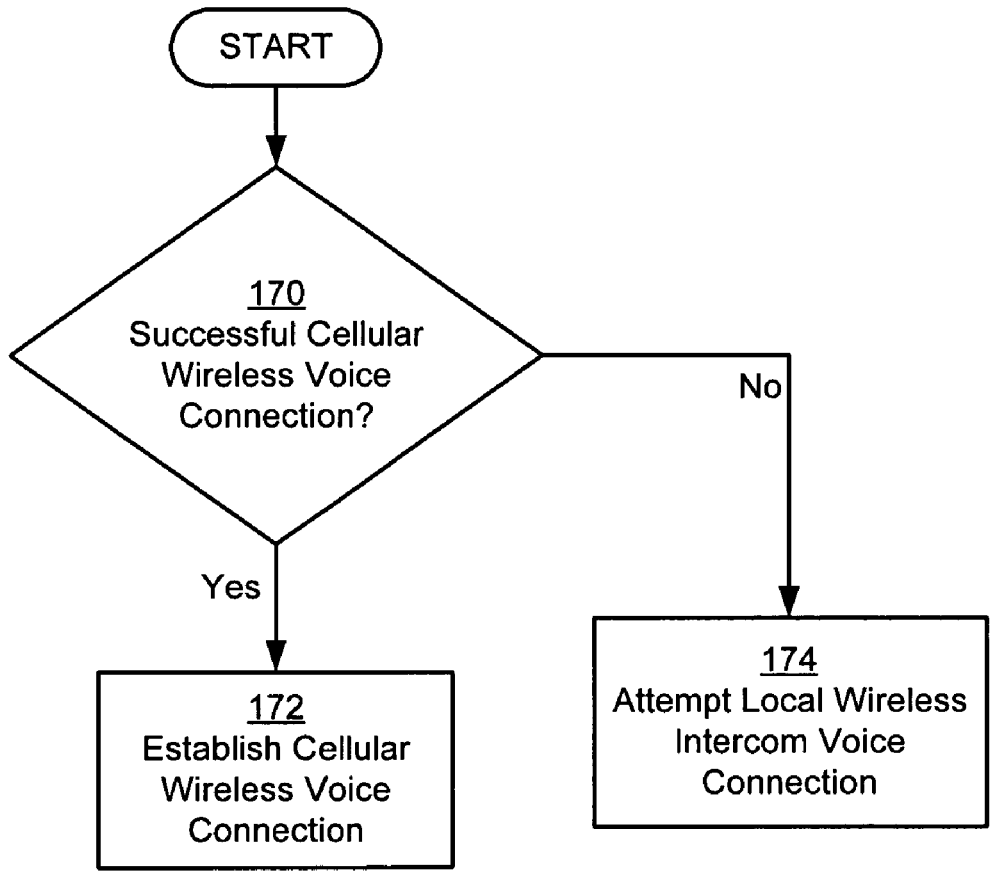
FIG. 5 is a flow chart depicting a secondary cellular wireless talk-around function.

FIG. 5 is a flow chart depicting a portion of a secondary cellular wireless talk-around function. A secondary cellular wireless talk-around function first attempts a voice connection over a cellular wireless communications pathway. Then, if the cellular wireless communications pathway is unavailable, the voice connection is attempted over a local wireless intercom communications pathway.

At 170, a first device determines whether a second device is available to establish the voice connection over the cellular wireless communications pathway. If the second device is available over the cellular wireless communications pathway, then, at 172, a voice connection is established over the cellular wireless communications pathway between the two devices. However, if the second device is unavailable for voice communications over the intercom pathway, then, at 174, a connection is attempted over the local wireless intercom communication network.

A number of functions are available, either alone or in combination, for determining whether the second device is available for a voice connection via the cellular wireless communications pathway. For instance, the first device may receive an indication from the cellular wireless communications network that a call initiation signal did not reach the second device. This indication may come in the form of a fast busy signal or as an SMS message, for instance.

V. Dual Pathway Fast Connection Function

Another embodiment provides a method of establishing a voice connection over one of two communication pathways.

In the embodiment, a first device receives a request to establish the voice connection with a termination-point. The request generally includes a telephone number (e.g., a 10 digit telephone number or mobile identification number) of the termination-point.

In response to the request, the first devices takes two actions: (i) attempting to establish a first voice connection over a cellular wireless communication pathway by using the telephone number as a call termination-point identifier; and (ii) attempting to establish a second voice connection with a second device associated with the telephone number via a local wireless intercom communications pathway. When one of the connections is established, the other attempted connection is aborted.

According to the embodiment, attempting to establish the second voice connection via the local wireless intercom communications pathway includes the function of determining whether the second device is available for a local wireless intercom session.

In a further embodiment, the attempt to establish the first voice connection is at least partially contemporaneous (overlaps in time) with the attempt to establish the second voice connection. As such, this method may save setup-time in case the initially attempted pathway is unavailable.

VI. Wireless Device Architecture

Figure 6:
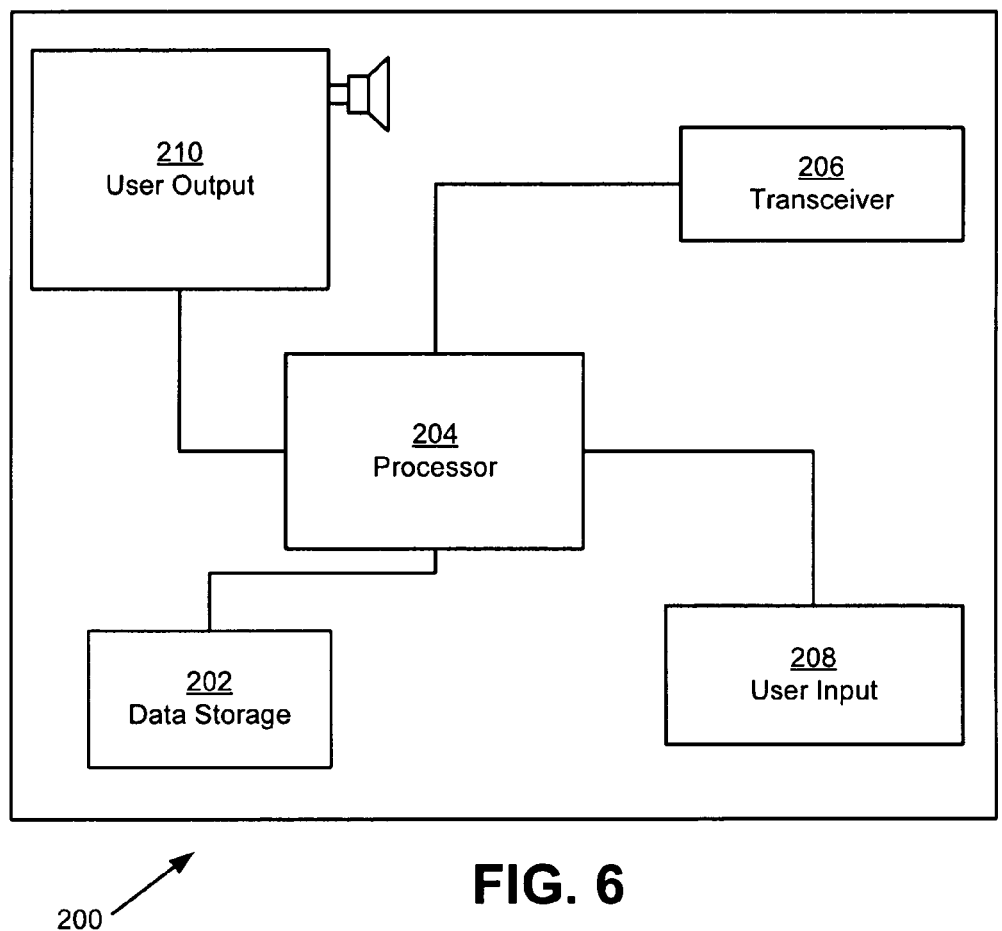
FIG. 6 is a simplified block diagram of a wireless device employed in the exemplary embodiment.

FIG. 6 is a simplified block diagram of a wireless device 200 employed in the exemplary embodiment. The wireless device 200 may be used as the first device 20 of FIG. 1, for instance. The wireless device 200 includes data storage 202 and a processor 204. The processor 204 may be configured to execute program code stored on data storage 202 in accordance with an embodiment of the invention. A transceiver 206 may provide both cellular wireless and local intercom functionality. Depending upon the RF frequencies of the various communication pathways, multiple transceivers may be preferred. A user input 208, such as a keypad or touch-screen provides an apparatus that allows a human user to issue requests and input data into the wireless device 200. As an example of a request the human user may request that the wireless device 200 place a call by entering a 10-digit telephone number and pushing the 'talk' button. A user output 210, such as a screen and/or speaker is available to provide notifications to the user. As an example of a notification, the screen may indicate a telephone number being called or a network pathway being used. The elements of the wireless device may be coupled together via a bus or other mechanism.

VII. Conclusion

Exemplary embodiments of the present invention have been described and illustrated. It will be understood of course that changes and modifications can be made consistent with the invention as claimed.

I claim:

1. A method for establishing a voice session between a first telephone and a second telephone, the first telephone and second telephone each being operable to engage in both BLUETOOTH communication and cellular wireless communication, at least the first telephone maintaining a list of trusted BLUETOOTH devices, the method comprising:

receiving a request at the first telephone, from a user of the first telephone, to initiate a voice session between the first telephone and the second telephone, wherein the request includes a telephone number of the second telephone without indicating a selection of which communication is to be used;

responsive to the request, the first telephone making a determination of whether the second telephone is available to participate in the voice session via BLUETOOTH communication, at least in part by determining whether the second telephone is within BLUETOOTH range of the first telephone, wherein determining whether the second telephone is within BLUETOOTH range of the first telephone comprises broadcasting the telephone number of the second telephone as a BLUETOOTH passkey for establishing BLUETOOTH pairing between the first telephone and the second telephone and determining whether the first telephone receives from the second telephone a response to the BLUETOOTH passkey broadcast by the first telephone;

in response to receiving the broadcast from the first telephone with the telephone number of the second telephone as a BLUETOOTH passkey, the second telephone generating a response to the first telephone so that the first and second telephones pair with one another in response to the BLUETOOTH passkey;

if the determination is that the second telephone is available to participate in the voice session via BLUETOOTH communication, the first telephone initiating the voice session with the second telephone via BLUETOOTH communication; and if the determination is that the second telephone is not available to participate in the voice session via BLUETOOTH communication, the first telephone automatically initiating the voice session with the second telephone via cellular wireless communication.

2. The method of claim 1, further comprising the first telephone making the determination of whether the second telephone is available to participate in the voice session via BLUETOOTH communication, at least further in part by determining whether the second telephone is listed as a trusted device in the list of trusted devices maintained by the first telephone.

3. The method of claim 1 wherein the second telephone establishes the first telephone as a trusted device in response to the BLUETOOTH passkey containing the telephone number of the second telephone.

* * * * *